United States Patent [19]

Burr

[11] Patent Number: 4,591,365
[45] Date of Patent: May 27, 1986

[54] SEMIPERMEABLE MEMBRANE GAS SEPARATION SYSTEM

[75] Inventor: Peter S. Burr, Munich, Fed. Rep. of Germany

[73] Assignee: Linde Aktiengesellschaft, Wiesbaden, Fed. Rep. of Germany

[21] Appl. No.: 660,814

[22] Filed: Oct. 15, 1984

[30] Foreign Application Priority Data

Oct. 15, 1983 [DE] Fed. Rep. of Germany ....... 3337572

[51] Int. Cl.[4] ............................................. B01D 53/22
[52] U.S. Cl. ............................................. 55/16; 55/68
[58] Field of Search ............................ 55/16, 68, 158

[56] References Cited

U.S. PATENT DOCUMENTS

| | | | |
|---|---|---|---|
| 1,496,757 | 6/1924 | Lewis et al. | 55/16 |
| 2,626,679 | 1/1953 | Harlow | 55/16 |
| 3,144,313 | 8/1964 | Pfefferle | 55/16 |
| 3,241,293 | 3/1966 | Pfefferle | 55/16 |
| 3,251,652 | 5/1966 | Pfefferle | 55/16 X |
| 3,651,618 | 3/1972 | Klein et al. | 55/16 |
| 3,735,558 | 5/1973 | Skarstrom et al. | 55/16 |
| 4,130,403 | 12/1978 | Cooley et al. | 55/16 |
| 4,172,885 | 10/1979 | Perry | 55/16 X |
| 4,180,552 | 12/1979 | Graham et al. | 55/16 X |
| 4,180,553 | 12/1979 | Null et al. | 55/16 X |
| 4,181,675 | 1/1980 | Makin et al. | 55/16 X |

FOREIGN PATENT DOCUMENTS

1409739 7/1965 France .

OTHER PUBLICATIONS

Chemical Engineering, Nov. 30, 1981, pp. 62–65, "Unique Membrane System Spurs Gas Separations".

Primary Examiner—Robert Spitzer
Attorney, Agent, or Firm—Millen & White

[57] ABSTRACT

In the separation of a more readily diffusing component from a gaseous mixture containing same and at least one less readily diffusing component, by diffusion via semipermeable membranes, a gas is fed to the passage side of the membranes, this gas being essentially free of ingredients of the more readily diffusing component, or in the alternative, such a gas also exhibiting a substantially higher rate of diffusion than the more readily diffusing component is fed to the barrier side.

5 Claims, 3 Drawing Figures

SEMIPERMEABLE MEMBRANE GAS SEPARATION SYSTEM

The invention relates to the separation of gases by selective diffusion through semipermeable membranes, as well as to an apparatus therefor.

Semipermeable membranes are utilized for the separation of gaseous mixtures containing components having different rates of diffusion. A gaseous mixture present under elevated pressure is fed to one side of the membranes, and one component of the gaseous mixture preferentially diffuses through the membranes with a concomitant a loss in processure. The less readily diffusable components remain on the barrier side of the membranes and are discharged from the diffusion device separately from the diffused component.

To maximize the yield of the diffused component, a large membrane area as well as a high pressure gradient between the barrier side (upstream side) and the passage side (downstream side) of the membranes are required. However, these requirements increase the installation and operating costs of the plant.

SUMMARY

An object of the invention is to provide a process of the type discussed above distinguished by a high yield of the diffused component obtained by an economical process and associated apparatus. Upon further study of the specification and appended claims, further objects and advantages of this invention will become apparent to those skilled in the art.

To attain these objects one aspect of this invention is to supply a gas essentially free of ingredients of the more readily diffusing component to the passage side of the membranes.

In other words, the diffusing gas is diluted by admixing, according to this invention, a gas directly on the passage side of the membranes. Thus, the partial pressure of the diffusing component drops on the passage side of the membranes. This means that the yield of the more readily diffusing component is increased since, at a lower partial pressure on the passage side, a higher diffusion rate is obtained. Conversely, with the yield remaining the same, the membrane exchange surface can be markedly reduced.

By conducting the process according to this invention, the yield is increased and the economics of the operation are improved.

In a preferred embodiment of the process of this invention, the gaseous mixture is a purge gas from an ammonia synthesis.

The purge gas contains, as the primary ingredients, nitrogen and hydrogen, as well as argon and methane. On account of its higher diffusion rate as compared with the other components, hydrogen is separated during diffusion.

It is advantageous to provide, according to a further aspect of the process of this invention, for the gas fed to the passage side of the membranes to be nitrogen. The addition of nitrogen on the passage side is of advantage, above all, in the above-described case of recovering hydrogen from the purge gas of the ammonia synthesis since in this way a mixture is formed of hydrogen and nitrogen which can be returned to the synthesis without further treatment to continue the conversion process.

In another preferred embodiment of the process of this invention, the gaseous mixture contains methane and carbon dioxide as the essential ingredients.

Such a gaseous mixture occurs, for example, in tertiary oil extraction. Also in this type of application, nitrogen, for example, is introduced on the passage side of the membranes.

It is suggested in an advantageous further development of the process of this invention that the gas fed to the passage side of the membranes have a substantially higher rate of diffusion than the more readily diffusing component of the gaseous mixture, and be admixed to the gaseous mixture as early as prior to diffusion.

The admixture of a gas prior to diffusion seems, at first glance, disadvantageous since thereby the partial pressure of the diffusing component is reduced on the barrier side of the membranes. However, since the admixed gas exhibits a substantially higher diffusion rate than the original more readily diffusing component of the gaseous mixture, the admixed gas will pass immediately to the passage side of the membranes where it provides the desired dilution effect. The admixing of a gas on the barrier side offers, in particular, the advantage of a low expenditure for structural parts.

It is especially advantageous for the gas admixed prior to diffusion to be steam. Besides providing the dilution effect, steam offers the advantage that it heats the gaseous mixture and thus prevents the condensation of nondiffusing components in the diffusion device. The steam admixture is especially suitable in case of a gaseous mixture with carbon dioxide and methane as the essential ingredients.

In a preferred further development of the process of this invention, the separation of the more readily diffusing component takes place by means of at least two-stage diffusion wherein the nondiffusing proportion of the gaseous mixture from the first diffusion stage is introduced into a second diffusion stage.

In each stage, a gas that reduces the concentration of the diffusing component is supplied to the passage side of the membranes. The multistage process is particularly advantageous from an energy viewpoint.

An apparatus for conducting the process of this invention comprises a diffusion device containing semipermeable membranes and provided with a gas inlet and gas outlet on the barrier side of the membranes, as well as with a gas outlet on the passage side of the membranes, and is characterized in that a gas inlet is arranged on the passage side.

This apparatus is suitable for a process wherein the gas fed to the passage side of the membranes is introduced from the outside directly into the diffusion device.

Another apparatus for conducting the process of this invention is characterized in that an additional gas inlet is in communication with the gas inlet.

This apparatus is utilized if the gas has been admixed to the gaseous mixture already on the barrier side and is conducted to the passage side by way of the membranes.

The membranes employed in this invention are conventional.

BRIEF DESCRIPTION OF DRAWINGS

The invention, as well as additional details of the invention, will be explained in greater detail with reference to schematically illustrated preferred embodiments.

DETAILED DESCRIPTION OF DRAWINGS

Figure 1:
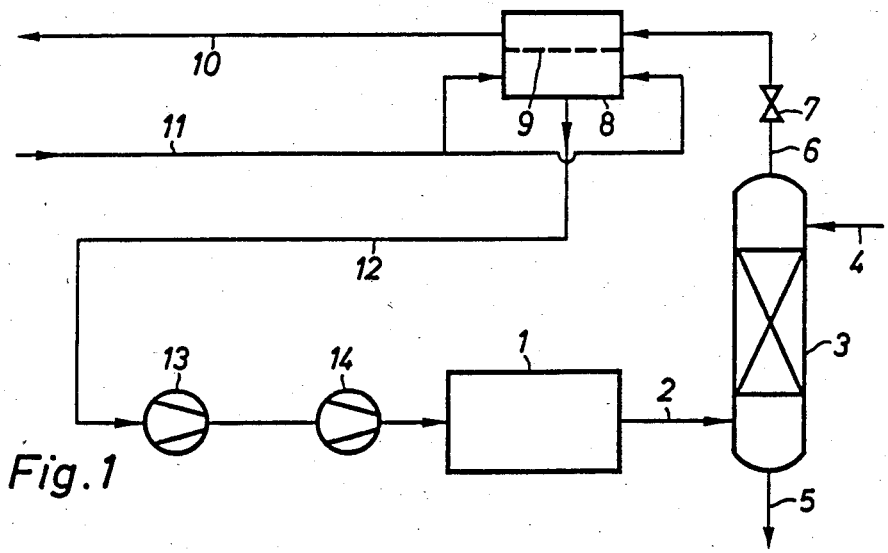
FIG. 1 shows a one-stage process according to this invention for the recovery of hydrogen.

The process according to FIG. 1 serves for the recovery of hydrogen from a purge gas of an ammonia synthesis. A purge gas 2 is withdrawn from the ammonia synthesis reactor 1 having, for example, the following composition:

59% $H_2$
20% $N_2$
6% Ar
10% $CH_4$
5% $NH_3$

The purge gas 2 is introduced into a scrubbing column 3 charged with water 4. $NH_3$ is scrubbed out of the purge gas rising in scrubbing column 3 and withdrawn from the scrubbing column 3 with the water via conduit 5. The purified purge gas exits from the scrubbing column 3 overhead via conduit 6. Its pressure is reduced in a valve 7 from about 140 bar to about 125 bar. The purified purge gas (4,000 $Nm^3/h$) has the following composition:

$H_2$ 62%; $N_2$ 21%; Ar 6%; $CH_4$ 11%.

The purge gas is then introduced into a diffusion device 8 containing semipermeable membranes 9. Based on differing diffusion rates of the components of the purge gas, a separation of the gaseous mixture is performed: A portion of the gaseous mixture does not diffuse through the membranes 9 and leaves the diffusion device 8 on the barrier side via conduit 10. The gas withdrawn via conduit 10 has a composition of $H_2$ 15%; $N_2$ 48%; Ar 13%; $CH_4$ 24%; its pressure is about 125 bar.

The more readily diffusing hydrogen passes to an extent of about 90% through the membranes 9 to the passage side of the diffusion device 8. Its pressure after diffusion is about 25 bar. According to the invention, a gaseous stream is added to the diffusion device 8 on the passage side of the membranes 9 in order to lower the hydrogen concentration. In the present case, this is a nitrogen stream 11 admixed on the passage side of the diffusion device. The pressure of the nitrogen is likewise about 25 bar.

The amount of nitrogen is controlled so that the thus-formed mixture withdrawn via conduit 12 from the diffusion device 8 has a hydrogen proportion of about 75% molar. With such a composition, the gaseous mixture can be directly returned into the ammonia synthesis after having been previously compressed in two compressor stages 13, 14 to 70 and 130 bar, respectively.

The energy requirement for this one-stage process is, with about 500 kW, somewhat higher than in case of a conventional, two-stage method; however, in the present instance only about 30% of the membrane area is needed.

Figure 2:
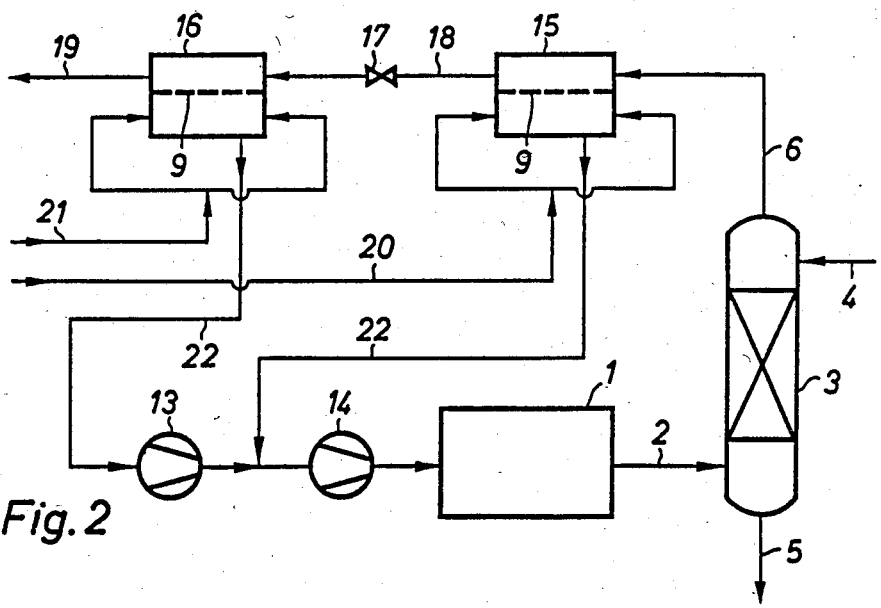
FIG. 2 shows a two-stage process according to this invention for the recovery of hydrogen.

FIG. 2 likewise illustrates a process for hydrogen recovery from the purge gas of the ammonia synthesis. Analogous structural parts bear the same reference numerals as in FIG. 1.

The purge gas (140 bar, 4,000 $Nm^3/h$), prepurified in scrubbing column 3, has the following composition:

$H_2$ 62%; $N_2$ 21%; Ar 6%; $CH_4$ 11%.

The gas is conducted into a first diffusion stage 15 wherein about 60% of the hydrogen is separated by diffusion. The nondiffusing proportions 18 of the gaseous mixture are expanded in a valve 17 to about 125 bar and passed on to a second diffusion stage 16 wherein about 70% of the hydrogen is separated by diffusion. The nondiffusing proportions are removed via conduit 19.

On the passage side, nitrogen 20, 21, respectively, is admixed to the hydrogen diffusing through the membranes 9 of the two diffusion devices 15, 16. The pressure of the nitrogen corresponds approximately to the pressure of the diffusing hydrogen, amounting in the diffusion device 15 to about 70 bar and in the diffusion device 16 to about 25 bar. The quantity of hydrogen is controlled so that a hydrogen content of about 75% is set in the formed gaseous mixture in both diffusion devices 15, 16.

The hydrogen/nitrogen mixture 22 from the diffusion device 16 is compressed, in a first compressor stage 13, to about 70 bar, then mixed with the hydrogen/nitrogen mixture 22 from the first diffusion device 15, and together therewith compressed to about 130 bar in a second compressor stage 14. The thus-compressed gaseous mixture is introduced into the ammonia synthesis 1.

The energy requirement for this process is about 300 kW and corresponds approximately to that of the conventional two-stage process. In contrast, only about 30% of the membrane area is required in the present case.

Figure 3:
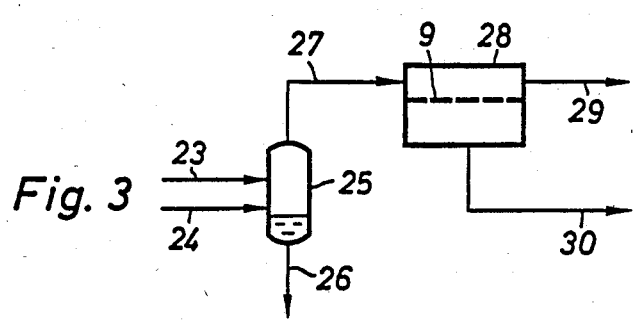
FIG. 3 shows a process according to this invention for the recovery of carbon dioxide.

FIG. 3 shows a process for recovering carbon dioxide from a gaseous mixture 23 containing about 80% $CO_2$, 20% $CH_4$, as well as small amounts of $C_{2+}$ hydrocarbons. The pressure of the gaseous mixture is about 50 bar, the temperature about 300° K. Such a gaseous mixture is obtained, for example, in tertiary oil extraction. In this case, the gas utilized for the dilution of the diffusing gas is not fed directly on the passage side of the diffusion device 28 but rather is admixed to the gaseous mixture to be separated as early as on the barrier side; however, from there, this gas passes very rapidly to the passage side on account of its diffusion rate which is substantially higher as compared with the components of the gaseous mixture.

In the present case, steam 24 (pressure about 50 bar, temperature about 536° K.) is admixed to the gaseous mixture 23. The amount of steam is about 5–25%, preferably 10–20% of the quantity of gas to be separated. The mixing takes place in a separator 25 wherein condensed steam is separated via conduit 26 from the gaseous mixture. The gaseous mixture 27 withdrawn overhead from separator 25 is fed to the diffusion device 28. Its temperature is about 371° K.

Since the permeability of the steam is about 20 times as high as that of carbon dioxide, and about 500 times as high as that of methane, the steam will diffuse preferentially through the membranes 9. By the steam present on the passage side of the membrane, the partial pressure of the carbon dioxide diffusing through the membranes 9 is lowered so that a high yield is attained.

The nondiffusing proportions of the gaseous mixture (essentially methane) leave the diffusion device 28 on the barrier side via conduit 29, whereas the diffused carbon dioxide/steam mixture is withdrawn via conduit 30. Besides the increase in yield, the steam has the effect that the gaseous mixture 27 is heated so that condensation of the $C_{2+}$ hydrocarbons is precluded.

The following table shows the yield and purity of carbon dioxide in dependence on the amount of steam introduced (the amount of steam is indicated in $Nm^3/h$ per 100 $Nm^3/h$ of gaseous mixture 23).

TABLE

| Amount of Steam ($Nm^3/h$) | $CO_2$ Yield | $CO_2$ Purity (Anhydrous) |
| --- | --- | --- |
| 0 | 94.5% | 94.0% |
| 10 | 95.0% | 94.1% |
| 20 | 95.4% | 94.2% |

The preceding embodiments can be repeated with similar success by substituting the generically or specifically described reactants and/or operating conditions of this invention for those used in the preceding embodiments.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for separating a more readily diffusing component from a gaseous mixture containing said readily diffusing component and at least one less readily diffusing component, by diffusion through a semipermeable membrane having an upstream barrier side and a downstream side, the improvement which comprises admixing to the gaseous mixture to be separated on the upstream barrier side about 2 to 25% of a gaseous component having a substantially higher rate of diffusion than said more readily diffusing component and diffusing resultant admixture, whereby the admixed gaseous component passes through the semipermeable membrane thereby lowering partial pressure of the more readily diffusing component on said passage side whereby the rate of diffission of the more readily diffused component is increased compared to a process wherein no admixture is conducted, wherein the gaseous mixture consists essentially of methane and carbon dioxide and the gaseous component admixed prior to diffusion is steam.

2. A process according to claim 1, wherein the gaseous mixture is a purge gas from an ammonia synthesis, said purge gas comprising hydrogen, nitrogen, methane and argon.

3. A process according to claim 1, wherein the gas admixed prior to diffusion is steam.

4. A process according to claim 1, wherein the separation of the more readily diffusing component takes place by at least two-stage diffusion, the nondiffusing proportion of the gaseous mixture from the first diffusion stage being introduced into a second diffusion stage.

5. A process according to claim 1 wherein the admixed component has a permeability through the semipermeable membrane of about at least 20 times as high as the more readily diffusing component.

* * * * *